United States Patent [19]

Hiller et al.

[11] 4,071,607
[45] Jan. 31, 1978

[54] PROCESS FOR PRODUCING SULFUR

[75] Inventors: Heinz Hiller, Rembrucken; Herbert Fischer, Lollar, both of Germany

[73] Assignee: Metallgesellschaft Aktiengesellschaft, Frankfurt am Main, Germany

[21] Appl. No.: 748,219

[22] Filed: Dec. 7, 1976

[30] Foreign Application Priority Data

Dec. 8, 1975 Germany ............................. 2555096

[51] Int. Cl.² ............................................. C01B 17/04
[52] U.S. Cl. ................................................. 423/574 R
[58] Field of Search ........................ 423/573, 574, 576

[56] References Cited

U.S. PATENT DOCUMENTS

| 2,767,062 | 10/1956 | Duecker | 423/576 |
| 3,702,884 | 11/1972 | Hunt et al. | 423/574 X |
| 3,709,976 | 1/1973 | Tarhan | 423/574 X |

FOREIGN PATENT DOCUMENTS

| 717,483 | 10/1954 | United Kingdom. |
| 1,151,316 | 5/1969 | United Kingdom. |

*Primary Examiner*—G. O. Peters
*Attorney, Agent, or Firm*—Karl F. Ross

[57] ABSTRACT

The gases discharged from the sulfur condenser of a Claus process reactor are contacted with an active adsorbent to remove further sulfur and the resulting exhaust gas is afterburned. A desorption gas is passed in closed cycle through the laden adsorbent and is heated, in this cycle, in heat exchange with the hot gases emerging from the afterburner. The sulfur is condensed from the desorption gas with the same cooling system used for the Claus process condensation and water vapor produced by the cooling system is condensed and by gravity is returned to the condensation stage.

7 Claims, 1 Drawing Figure

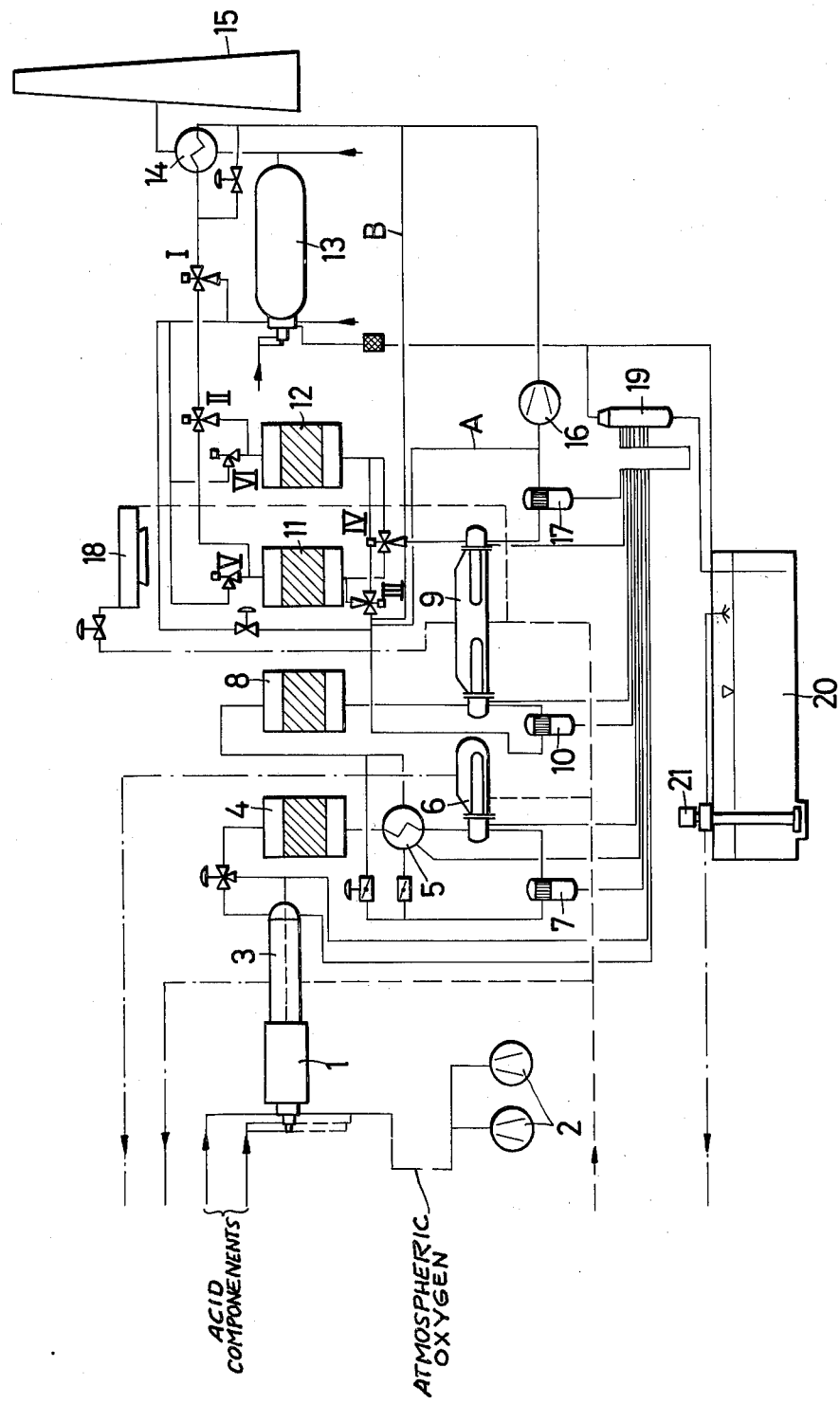

PROCESS FOR PRODUCING SULFUR

FIELD OF THE INVENTION

This invention relates to a process for producing sulfur from acid gases which contain hydrogen sulfide and other sulfur compounds, in which the hydrogen sulfide is partly burnt to produce sulfur and sulfur dioxide, the hydrogen sulfide contained in the resulting process gas is catalytically reacted with sulfur dioxide at low temperature to produce sulfur, the sulfur is condensed (Claus process), the exhaust gas is purified with recovery of sulfur in that the exhaust gas is caused to flow over active adsorbents at a still lower temperature, and the laden adsorbent is desorbed with hot gases, wherein process gas is used as a gas for desorbing the laden adsorbent and is conducted in a closed cycle, and the residual sulfur and the residual hydrogen sulfide are afterburned with oxygen and reacted to produce sulfur dioxide.

BACKGROUND OF THE INVENTION

It is known that hydrogen sulfide contained in gas mixtures can be catalytically reacted with sulfur dioxide in the Claus process to produce sulfur (Opened German Specification-Offenlegungsschrift-DT-OS 2,253,806 corresponding to U.S. Pat. No. 3,896,215).

It is also known to cause the resulting exhaust gases to flow over an activated-carbon adsorbent at elevated temperatures to form elementary sulfur. The laden activated carbon can be regenerated by a treatment at temperatures of 350° to 550° C with an inert gas which is virtually free from oxygen, carbon dioxide, and water (German Pat. No. 1,667,636).

It has also been suggested to use alumina, which may be impregnated, if desired, or mixtures of alumina and silica, rather than activated carbon as an adsorbent. In that case the time of contact of the exhaust gas to be desulfurized is maintained between 1 and 25 seconds and the adsorbent is subsequently regenerated by a treatment with oxygen-free gas at temperature between 200° and 350° C (Opened German Specification (Offenlegungsschrift) DT-OS 2,319,532).

A process of lowering the content of combined sulfur in Claus process exhaust gases has been proposed in which the Claus process exhaust gases are cooled and the sulfur is condensed, the resulting gas, which is substantially free from elementary sulfur, is catalytically reacted to produce sulfur, the flow of gas into the catalyst bed is stopped when the degree of conversion has decreased, and a hydrogen-sulfide-containing gas at temperatures above the dewpoint of sulfur is passed through the catalyst bed to evaporate elementary sulfur from said bed until the activity of the catalyst has been restored (Opened German Specification Offenlegungsschrift - DT-OS 2,021,111).

Claus process exhaust gas or another $H_2S$-containing gas is used as a desorption gas in that process, in which the $H_2S$ contents are relatively high and may be as high as 50% by volume. That process requires a special control of the gaseous constituents to be reacted and an exact supervision.

Specifically, the separate heating of the regenerating gas creates high energy requirements. Another disadvantage is that the recycling of the $H_2S$-reducing gas to the Claus process plant requires a high pressure and a separate gas blower.

Those known processes must be carried out in a plurality of stages, as a rule. For instance, the process according to German Pat. No. 1,667,636 comprises a first stage in which sulfur is formed in the presence of activated carbon, and a succeeding stage, in which the $H_2S$-containing gas, to which oxygen-containing gas has been added, is reacted to produce sulfur also in the presence of activated carbon.

In the process according to Opened German Specification No. 2,319,532 the regenerated adsorbent is purged at a temperature below 180° C with oxygen-free gas and the purge gas contains added water vapor at least during part of the purging operation.

OBJECTS OF THE INVENTION

It is an object of the invention to provide a simple method in which sulfur can be recovered by the Claus process and, in the same operation, the remaining exhaust gases can be purified to such a high degree that they can be discharged into the atmosphere without hesitation.

It is another object to provide a process of this type which enables a recovery of elemental sulfur such that virtually all sulfur compounds contained in the starting material have been reacted to form elemental sulfur.

Still another object is to provide such a process which is economical and, contrary to the known processes, requires only a low energy consumption.

SUMMARY OF THE INVENTION

These objects are accomplished according to the invention by a combination of steps which we have found to be vital for the improved energy balance and efficiency, namely:

a. the heat required for the desorption of the laden adsorbent is recovered by subjecting the desorption gas to heat exchange with the exhaust gas which is heated by the heat of reaction generated by reacting the residual sulfur and residual hydrogen sulfide with oxygen in an afterburner, b. the sulfur is separated from the desorption gas in that the latter is cooled by the cooling system used for the preceding Claus process (i.e. in the sulfur condenser thereof) and with generation of wwater vapor, c. the water vapor is condensed, and d. the condensate is fed by gravity to the sulfur-condensing stage and is used therein to condense the sulfur.

Advantageously, the amount of hydrogen-sulfide-containing acid gases added to the process gas used for the desorption of the laden adsorbent may be so large that the $H_2S$ content of the process gas amounts preferably to 5–10% by volume.

The advantages afforded by the invention reside particularly in that the process is highly economical and has only a low energy consumption and that a perfectly pure exhaust gas is obtained which can be discharged into the atmosphere without hesitation. The sulfur yield is almost 100%.

The process permits of a matching of the dimensions of the Claus process equipment and of the exhaust gas purifier so that one step can be matched to the other and a fully continuous operation is achieved.

According to a preferred feature of the invention the amount of $H_2S$ added to the process gas used for the desorption of the laden adsorbent is so large that the $H_2S$ content is between approximately 5% and 10% by volume. This feature affords the advantage that the sulfate content of the catalyst can be limited so that the catalyst preserves its activity for a long time.

BRIEF DESCRIPTION OF THE DRAWING

The sole FIGURE of the drawing is a flow diagram of a plant according to the invention.

SPECIFIC DESCRIPTION AND EXAMPLE

Acid constituents coming from a scrubber are reacted in a Claus process combustion chamber 1 with atmospheric oxygen, which is fed by a blower 2. The resulting heat of reaction is used to generate high-pressure steam in a waste-heat boiler 3, which succeeds the combustion chamber. Depending on its COS and $CS_2$ contents, the process gas is cooled to 260°–300° C and is then fed to a first Claus process reactor 4.

The temperature is automatically controlled by means of hot gas coming from the combustion chamber under an automatic control effected by suitable bypass valves. On a suitable catalyst, the $H_2S$ is then further reacted with $SO_2$ to produce elementary sulfur. COS and $CS_2$ are hydrolyzed and in dependence on the $H_2S$ content of the process gas are partly hydrogenated.

The process gas leaving the Claus process reactor 4 is passed through the tubes of a shell-and-tube heat exchanger 5 and then through a sulfur condenser 6 and is thus cooled to temperatures below 165° C to remove the sulfur which is contained in the gas. The waste heat is utilized to generate medium-pressure steam.

The process gas which has left the sulfur condenser 6 is passed through a sulfur separator 7 and is then passed through the shell passage of the heat exchanger 5 and is thus heated to the operating temperature (about 200°–220° C) of a second Claus process reactor 8. The temperature is automatically controlled by a bypass arrangement. In the second Claus process reactor 8, the $H_2S$ is further reacted with $SO_2$ to produce sulfur at a temperature which is within a range in which the conversion of COS to $CS_2$ is negligible.

Because the reaction of $H_2S$ with $SO_2$ to produce S is an exothermic process, a decrease in temperature will result in an equilibrium ratio which is more favorable for the formation of S. For this reason the second reactor is operated only a few degrees above the dewpoint of sulfur so that a satisfactory continuous operation is ensured. In this way a sulfur recovery up to 95%, depending on the $H_2S$ content of the acid gas, can be accomplished in continuous operation.

The process gas leaving the second reactor 8 is fed to another sulfur condenser 9 and is cooled therein below 135° C but not below 120° C. The sulfur contained in the process gas is thus precipitated down to a content below 1 gram per standard cubic meter.

This sulfur condenser 9 is also succeeded by a sulfur separator 10, which is designed like the unit 7. The process gas which leaves the separator 10 is fed at a temperature of about 135° C to the one of the reactors 11 and 12 which is then in operation. In that reactor, a further Claus process reaction is effected in the sulfur-condensing temperature range.

That reactor contains impregnated alumina as an active adsorbent.

At the prevailing temperatures (about 135° C), $H_2S$ and $SO_2$ react to form sulfur and a sulfur recovery up to 99% can be accomplished in continuous operation.

Because the sulfur formed in the reactor 11 or 12 is adsorbed by the catalyst, the latter must be thermally regenerated when it has been laden to a certain degree.

The process gas leaving the reactor 11 or 12 is fed at a temperature of about 135° C to an afterburner chamber 13, in which the residual contents of $H_2S$, COS, $CS_2$, S, $H_2$, and CO are completely oxidized with a suitable excess of air. The regulations for the prevention of air pollution require the operation of the afterburner chamber at temperatures between 600° and 800° C and an $H_2S$ content not in excess of 10 milligrams per standard cubic meter in the exhaust gas. These temperatures are ensured by a burning of fuel gas.

The gas which leaves the afterburner chamber 13 is quenched with cold air (or passed through another waste-heat boiler, which is not shown) and is then fed through a preheater 14 for the regenerating gas to a chimney 15 for discharge into the atmosphere.

The laden adsorbent is regenerated in two steps consisting of desorption and subsequent cooling.

Desorption is accomplished with an oxygen-free desorption gas, which is circulated in a closed cycle. This is connected by a breather line A to the process gas conduit leading to the reactor 11 or 12.

A gas blower 16 is operated to feed the desorption gas over the gas heater 14, where the desorption gas is heated to an automatically controlled temperature of about 300° C. The gas is then fed through a three-way valve to the laden reactor 11 or 12. During its passage through the catalyst bed, the desorption gas becomes saturated with sulfur in a degree which depends on the sensible heat that is available. The gas then leaves the reactor through a three-way valve IV.

The desorption gas is cooled in the sulfur condenser 9 below 135° C but not below 120° C and is thus freed from sulfur. The gas is then passed through a sulfur separator 17, which is designed like the separator 7 and 10, and is then fed back to the gas blower 16.

Desorption is considered as terminated when sulfur no longer flows from the sulfur condenser 9 and the sulfur separator 17. The need for visual supervision can be eliminated if a schedule is prepared on the basis of empirical data.

To lower the sulfate content of the catalyst, $H_2S$ from the acid gas is added to the desorption gas in such an amount that an $H_2S$ content of, e.g. 5–10% by volume is ensured during the desorption. Cooling is effected when the desorption has been completed. The cooling gas consists of a partial stream of the purified gas which leaves the reactor 11 or 12 that is then in operation. That gas is at a temperature of about 135° C.

Cooling gas at a suitable rate controlled by valve V or VI is fed through the reactor 11 or 12 which is to be cooled . That gas flows through the three-way valve IV, the sulfur condenser 9 and subsequently through the separator 17 and is fed by the gas blower 16 over the gas heater 16 and through the three-way valve I to the gas to be fed to the afterburner chamber 13. Cooling is continued until the reactor 11 or 12 which is then in operation is disconnected from the process gas stream.

Before the cooling gas is fed through the desorbed catalyst of the reactor 11 or 12 at the beginning of the cooling period, the desorption gas having a high $H_2S$ content is blown out through the conduit B by means of process gas which is withdrawn through breather line A from the process gas to be fed to reactor 11 or 12 and is returned to the process gas stream to be fed to reactor 11 or 12. The heats of reaction and desorption which become available in the sulfur condenser 9 are converted to saturated steam at 2 bars, which is condensed in an air-cooled steam condenser 18. The water (condensate) formed therein used to in part cool condenser 9, flowing thereto by gravity.

The process is automatically controlled by a gas chromatograph or analyzer, which analyzes the $H_2S:SO_2$ ratio of the gas to be fed to reactor 11 or 12 and delivers the required signals to an automatic control system. The $H_2S:SO_2$ ratio is almost 2.

The sulfur which becomes available in various units (3, 5, 6, 7, 8, 10, 17) is removed from the plant through jacket-heated pipes, which are subjected to a special dipping operation and lead to a sulfur collector 19, which is connected to a sulfur pit 20. The sulfur is fed to a loading station by a pump 21 immersed in the sulfur.

EXAMPLE

50 Metric tons per day Sulfur-Plant
Acid-Gas to combustion chamber 1

| | |
|---|---|
| rate: | 1975 Nm 3/h |
| pressure: | 1.4 bar abs. |
| composition: | |
| $H_2S$ | 1490 Nm 3/h |
| $H_2O$ | 163 Nm 3/h |
| $CO_2$ | 275 Nm 3/h |
| $CH_4$ | 47 Nm 3/h |

Air to combustion chamber 1

| | |
|---|---|
| rate: | 3596 Nm 3/h |
| pressure: | 1.4 bar abs. |

Temperature of Claus combustion chamber 1 1120° C.

| | Process gas to reactor 4 | Process gas to reactor 8 | Process gas to reactor 11/12 |
|---|---|---|---|
| rate: | 5205 Nm 3/h | 4974.5 Nm 3/h | 4925.7 Nm 3/h |
| pressure: | 1.25 bar abs. | 1.16 bar abs. | 1.09 bar abs. |
| Temperature | | | |
| entrance | 280° C | 210° C | 135° C |
| exit | 325° C | 233° C | 140° C |
| Composition vol. % | | | |
| $H_2S$ | 5.1354 | 2.4313 | 0.5592 |
| $SO_2$ | 2.9818 | 1.2420 | 0.3062 |
| $H_2O$ | 26.1322 | 30.2848 | 32.4813 |
| $S_2$ | 0.0083 | 0.0001 | 0.0000 |
| $S_3$ | 0.0011 | 0.0000 | 0.0000 |
| $S_4$ | 0.0009 | 0.0000 | 0.0000 |
| $S_5$ | 0.0335 | 0.0006 | 0.0000 |
| $S_6$ | 0.5970 | 0.0135 | 0.0014 |
| $S_7$ | 0.4398 | 0.0065 | 0.0006 |
| $S_8$ | 1.6035 | 0.0331 | 0.0090 |
| COS | 0.6278 | 0.0341 | 0.0344 |
| $CS_2$ | 0.1015 | 0.0106 | 0.0107 |
| CO | 0.9202 | 0.9629 | 0.9724 |
| $CO_2$ | 4.5369 | 5.4654 | 5.5196 |
| $H_2$ | 2.2966 | 2.4030 | 2.4268 |
| $N_2$ | 54.5835 | 57.1121 | 57.6784 |

Conversion of $H_2S$ to S in % overall

| Process gas to reactor 4 | reactor 8 | reactor 11/12 | incinerator |
|---|---|---|---|
| 68.74 | 87.55 | 96.95 | 99.42 | rate of Sulfur recovery in % overall

| Process gas behind reactor 4 | reactor 8 | reactor 11/12 |
|---|---|---|
| 86.23 | 96.67 | 99.11 |

Process gas to incinerator 13 Waste gas to chimney 15

| | | |
|---|---|---|
| rate | 4913.4 Nm 3/h | 1749.2 Nm 3/h |
| pressure | 1.0 bar abs. | 0.998 bar abs. |
| temperature | 135° C | 380° C |
| composition | vol. % | vol. % |
| $H_2S$ | 0.0608 | 0.0 |
| $SO_2$ | 0.0588 | 0.0755 |
| $H_2O$ | 33.0593 | 11.6313 |
| $S_8$ | 0.0116 | 0.0 |
| COS | 0.0345 | 0.0 |
| $CS_2$ | 0.0108 | 0.0 |
| CO | 0.9749 | 0.0 |
| $CO_2$ | 5.5334 | 2.9641 |
| $H_2$ | 2.4329 | 0.0 |
| $N_2$ | 57.8230 | 72.7791 |
| $O_2$ | 0.0000 | 12.55 |
| Fuel gas to incinerator 13 calorific value 13832 Kcal/Nm³ | | air to incinerator 13 |
| rate: | 106 Nm 3/h | rate: 2378 Nm 3/h |
| quench air to wastegas | | |
| rate: | 10134 Nm 3/h | |
| desorption gas for reactor 11/12 | | |
| rate: | 2500 Nm 3/h | |
| cooling gas for reactor 11/12 | | |
| rate: | 2500 Nm 3/h | |
| Waste heat for stem production | | |
| Waste heat boiler 3 | | 2.367.645 Kcal/h for high pressure steam |
| sulfur-condenser 6 | | 493.398 Kcal/h for middle pressure steam. |

We claim:

1. A process for producing sulfur from an acid gas containing hydrogen sulfide and other sulfur compounds, said process comprising
   a. combusting said acid gas partially to produce a process gas stream containing hydrogen sulfide sulfur and sulfur dioxide;
   b. catalytically reacting the hydrogen sulfide, with sulfur dioxide in said process gas stream in a Claus process reactor and condensing sulfur from the catalytically reacted stream with a cooling system to produce a further gas stream containing residual sulfurous components;
   c. passing said further gas stream at a lower temperature than that of the catalytic reaction of step (b) over an active adsorbent to load said adsorbent with sulfur and produce another gas stream;
   d. afterburning the gas stream produced in step (c) which still contains rasidual sulfur and residual $H_2S$ with oxygen to produce a hot exhaust gas stream substantially free from hydrogen sulfide and sulfur and consisting mainly of sulfur dioxide;
   e. desorbing the laden adsorbent from step (c)by
      $e_1$. circulating a desorption gas in closed cycle through said laden adsorbent;
      $e_2$. heating said desorption gas before it contacts said laden adsorbent along said closed cycle by passing it in heat exchange with said hot exhaust gas from step (d); and
      $e_3$. condensing sulfur from said desorption gas after it has contacted said laden adsorbent along said cycle with said cooling system from step (b),
      $e_4$. said cooling system containing water;
   f. generating water vapor thereby by said cooling, and
   g. condensing said generated water vapor and recycling same by gravity to step ($e_3$) to condense the sulfur.

2. The proces defined in claim 1 wherein said desorption gas is a portion of said process gas.

3. The process defined in claim 2, further comprising the step of passing a portion of said other gas stream of step (c) through said laden adsorbent as a cooling gas subsequent to the desorption thereof.

4. The process defined in claim 2, further comprising the step of enriching said portion of said process gas with $H_2S$ to a level of 5 to 10% by volume therein.

5. The process defined in claim 1 wherein the sulfur is condensed in steps (b) and ($e_3$) in a common sulfur condenser.

6. The process defined in claim 1 wherein step (b) is carried out in two successive stages.

7. The process defined in claim 1 wherein step (c) is carried out in one adsorber while step (e) is being carried out in another adsorber, the adsorbers being switched over when the adsorbent in said one adsorber becomes laden with sulfur.

* * * * *